Dec. 17, 1929. F. J. MERSFELDER ET AL Re. 17,528

CLEAN-OUT PLUG

Original Filed May 18, 1927

Inventors:
F. J. Mersfelder & Paul Balze
By their Attorney Geo. F. Becker

Reissued Dec. 17, 1929 Re. 17,528

UNITED STATES PATENT OFFICE

FREDERICK J. MERSFELDER AND PAUL BALZE, OF LEONIA, NEW JERSEY, ASSIGNORS TO M. & B. MANUFACTURING CO., INC., OF LEONIA, NEW JERSEY, A CORPORATION OF NEW JERSEY

CLEAN-OUT PLUG

REISSUED

Original No. 1,702,878, dated February 19, 1929, Serial No. 192,357, filed May 18, 1927. Application for reissue filed May 7, 1929. Serial No. 361,238.

This invention relates to improvements in clean out plugs and has particular reference to detachable plugs used in connection with clean outs on drains.

The ordinary clean out, used in connection with drains, consists of a body in the nature of a hollow cylinder of a suitable size, into one end or side of which is fitted, by a screw thread, a brass plug. The body is usually made of iron and is caulked into the hub of the pipe or trap, leaving the brass plug removable for the purpose of cleaning the drain or tray. In many cases the brass plug is lost or broken requiring its replacement. Since the threaded portions of the body and plug vary somewhat as to their diameters from other bodies and plugs, it becomes very difficult to obtain the size of the new plug that will properly fit the body. In many cases it becomes necessary to remove the old body from the hub and to replace it with a new body for which the plug is furnished, but this replacement of the new body and plug involves much labor and expense.

Among the objects therefore of this present improvement is to provide a plug which will fit into clean-out bodies of various diameters and which consequently will eliminate the necessity for replacing or renewing the body of the clean out when only a new plug is required. This object is attained by providing a new plug with an excessive taper whereby it will be sure to fit the threaded holes of bodies of various diameters and to so form the thread or threaded surface portion of the new plug in a peculiar manner adapting it to mate in a liquid and gas tight manner with the standard thread formed on the body.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof, reference is had to the accompanying drawings in which like reference characters designate the same parts in the several views, and in which—

Referring now more specifically to the drawings, we show at 10 a clean out plug comprising two main parts,—a core 11 of any suitable strong rigid metal such as cast iron and preferably hollow for cheapness and lightness, and a collar 12 of a softer metal such as lead, a mixture of lead and antimony, or a mixture of lead and tin, the collar being molded or cast upon the periphery of the core 11. The core is preferably formed with suitable cavities of any desired formation or nature into which the molten softer metal of the collar will enter during the process of formation of the collar upon the core.

It will be noted that the plug is so formed as to have a greater taper than is usually found in clean out plugs or the like. Without intending to be unnecessarily limited to any particular dimensions in this regard, we suggest that the amount of taper should be in the proportion of about three inches to twelve inches in length of the plug.

During the formation of the collar 12, a thread 14 is cast thereon. This thread is of peculiar formation in that it is of V-shape generally speaking, sharp on top or on the outside, but substantially flat on the bottom or inside at 15.

Figure 1:
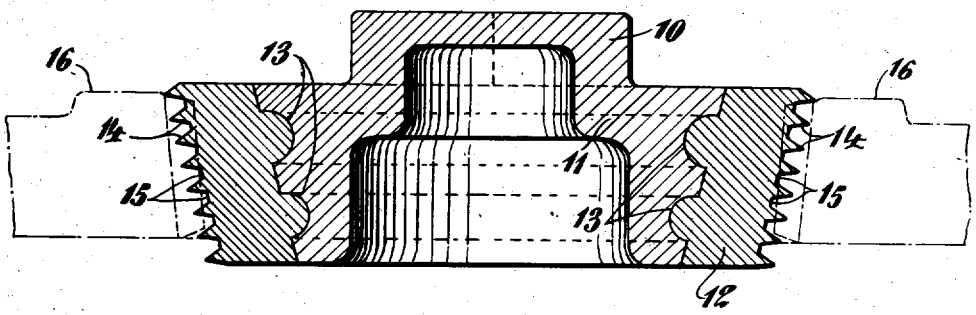
Figure 1 is a vertical sectional view of our improved clean out plug.
Figure 2:
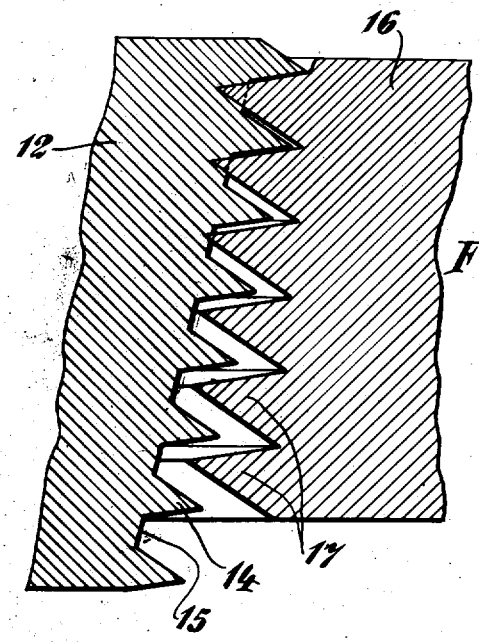
Fig. 2 is an enlarged sectional or fragmentary diagram indicating the relation of the clean out plug threads to the hard metal body structure.

16 indicates a fragment of a body with which the plug is adapted to co-operate. These bodies are usually formed with standard threads of the same general character as found on the plug, that is to say of V-shape, but with sharp tops and bottoms. The amount of taper in the body opening is materially less than that of the plug above described, and may be zero, and while the threads 17 of the body are practically uniform or standard, the diameters of the openings in the bodies are by no means uniform or standard. It will be seen therefore that our new plug having an excessive taper may readily be driven or turned into the opening of the body 16 irrespective of a considerable variation in diameter of the body opening. As shown best in Fig. 2, when the tapered plug is so driven into the body opening, the sharp pointed edges of threads 17 will bite into the flat bottoms 15 of soft metal of the plug collar for a number of turns and thereby insure a tight and reliable connection between the plug and the body, and, moreover, making a connection which is separable from time to time as may be required for clean out purposes and without disturbing the effective replacement capability of the plug.

We claim:

1. The herein described fitting comprising a member having a uniform taper throughout the length thereof, the thread having a broad root of a different diameter than a thread to engage same, said member having a soft metal body to permit a new thread to be cut into the said root on engaging said member with a hard metal threaded device, the taper of the thread of the soft metal member being greater than that of the other member, the pitch of the angles of the sides of the thread being substantially the same for both members.

2. A closure member of the character set forth, including a core of hard metal, a layer of soft metal cast upon said core, said layer being threaded and having a substantially uniform taper throughout the length thereof, said thread having a broad root of a different diameter than that of a thread engageable therewith, said broad root permitting a new thread to be cut into said root on engagement with a hard metal taper-threaded device, the taper of the first mentioned thread being greater than that of the thread of said device, the taper of the first mentioned thread permitting the closure member to be used with hard metal threaded devices of different diameters.

3. In combination, a rust proof clean out plug, and threaded drainage fittings of various sizes, the taper of the thread of the plug being considerably greater than that of the said fittings, and having approximately the same number of threads as the latter, for the purpose set forth.

In testimony whereof we affix our signatures.

FREDERICK J. MERSFELDER.
PAUL BALZE.